United States Patent [19]

Fukui

[11] Patent Number: 5,359,882
[45] Date of Patent: Nov. 1, 1994

[54] APPARATUS FOR DETECTION AND DECISION OF OCCURRENCE OF MISFIRE IN INTERNAL COMBUSTION ENGINE

[75] Inventor: Wataru Fukui, Himeji, Japan

[73] Assignee: Mitsubishi Denki Kabushiki Kaisha, Tokyo, Japan

[21] Appl. No.: 9,675

[22] Filed: Jan. 27, 1993

[30] Foreign Application Priority Data

Feb. 4, 1992 [JP] Japan ................................ 4-019144

[51] Int. Cl.$^5$ ............................................. G01M 15/00
[52] U.S. Cl. ................................................. 73/117.3
[58] Field of Search ................ 73/35, 117.3, 115, 116; 364/431.06, 431.08

[56] References Cited

U.S. PATENT DOCUMENTS

| | | | |
|---|---|---|---|
| 3,908,366 | 9/1975 | Masaki | 73/117.3 |
| 4,762,106 | 8/1988 | Blauhut | |
| 5,088,318 | 2/1992 | Osawa | 73/117.3 |
| 5,095,742 | 3/1992 | James et al. | 73/116 |
| 5,231,869 | 8/1993 | Klenk et al. | 73/116 |

FOREIGN PATENT DOCUMENTS

WO90/02874 3/1990 WIPO .

*Primary Examiner*—Robert Raevis
*Attorney, Agent, or Firm*—Sughrue, Mion, Zinn, Macpeak & Seas

[57] ABSTRACT

An apparatus for deciding occurrence of misfire in an internal combustion engine comprises an angle sensor for generating a reference position signal corresponding to a predetermined crank angle of an engine cylinder, a sensor for detecting a running state of the engine, an ion current detector for detecting combustion state in the engine cylinder, a control parameter setting means for setting a control parameter of the engine on the basis of the reference position signal and the running state, a misfire detector for generating a misfire detection signal indicative of occurrence of misfire in the engine on the basis of detection output of the ion current detector, a misfire interval counter for measuring as a misfire interval an interval at which the misfire detection signal is generated, a misfire decision means for generating a misfire decision signal when the misfire interval becomes shorter than a predetermined interval. The control parameter setting means corrects the control parameters on the basis of the misfire decision signal to thereby suppress the occurrence of misfire. A high degree of reliability can be assured in the decision of misfire occurrence without the need for complicated and expensive decision logic.

7 Claims, 5 Drawing Sheets

APPARATUS FOR DETECTION AND DECISION OF OCCURRENCE OF MISFIRE IN INTERNAL COMBUSTION ENGINE

BACKGROUND OF THE INVENTION

1. Field of the Invention

The present invention relates generally to an apparatus for detecting or deciding occurrence of a misfire in an internal combustion engine on the basis of an ion current or the like quantity indicative of a combustion state taking place in the engine. More particularly, the present invention is concerned with a misfire detecting or deciding apparatus for an internal combustion engine which is capable of detecting or deciding occurrence of misfire in the engine with high reliability without resorting to the aid of any complicated logic.

2. Description of the Related Art

In general, in an internal combustion engine (hereinafter referred to simply as an engine) having a crankshaft driven by a plurality of engine cylinders and a camshaft operatively connected with the crankshaft, a reference position signal generated in synchronism with the rotation of the engine is utilized for determining or controllably setting a variety of timings for the engine operation controls such as an ignition timing, a fuel injection timing and the like. To this end, an angular position detector for generating a reference position signal is mounted on the crankshaft or the camshaft at such a position that the reference position signal as generated indicates a predetermined reference position which corresponds to a predetermined crank angle (i.e., angle of rotation of the crankshaft).

When a misfire occurs within an engine cylinder in the ignition cycle as a result of the absence of combustion, abnormal explosion known as after-burning will take place in succession to the ignition cycle, involving injury of the engine cylinder and/or damage of a catalyst employed for catalytic treatment of the exhaust gas due to the contact with an uncombusted gas mixture (i.e., air/fuel mixture undergone no combustion). Under the circumstances, a variety of measures are developed and adopted in an attempt for suppressing occurrence of misfire in the engine, to thereby secure more positive protection of the engine.

For better understanding of the background of the present invention, a misfire detection or decision apparatus for the engine known heretofore will be described in some detail by reference to the drawings.

Figure 7:
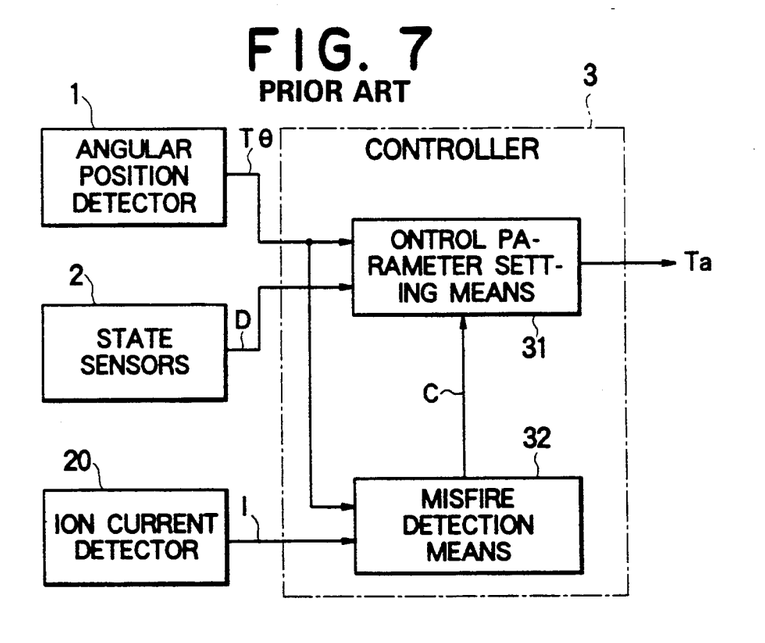
FIG. 7 is a functional block diagram showing an engine misfire detection/decision apparatus known heretofore.

FIG. 7 is a functional block diagram showing a general arrangement of an engine misfire detection/decision apparatus known heretofore.

Referring to the figure, a reference numeral 1 denotes an angular position detector which is usually constituted by a rotatable toothed disk mounted on a camshaft of an engine and a sensor installed in opposition to the disk for generating a pulse-like reference position signal $T\theta$ at a reference position corresponding to a predetermined crank angle in synchronism with the revolution of the engine. Usually, the reference position is set at B75° (i.e., at a position 75° before the top dead center in each engine cylinder) or B5°. A reference numeral 2 designates collectively a set of sensors for detecting a variety of engine operation states D such as an intake air flow (or an opening degree of a throttle valve) indicative of an engine load, a rotation speed (rpm) of the engine, an intake air temperature and so forth. A numeral 20 denotes an ion current detector for detecting an ion current I generated within the engine cylinder immediately after the combustion. In other words, the ion current detector 20 serves for a combustion state detecting function for detecting the combustion state in an associated one of the engine cylinders. Of course, such ion current detector 20 may be provided in association with all the engine cylinders or alternatively for a given number of the engine cylinders, respectively, as occasion requires. A reference numeral 3 generally denotes a control unit which is usually constituted by a microcomputer and which includes an engine control parameter setting means 31 for arithmetically determining a control parameter Ta for each engine cylinder on the basis of the reference position signal $T\theta$ and the engine operation state signals D mentioned above and a misfire detecting means 32 for detecting the misfire event and generating a misfire detection signal C on the basis of the reference position signal $T\theta$ and the detected ion current value (indicative of the combustion state) I.

The engine control parameter setting means 31 is designed for generating as the engine control parameter Ta a control timing signal which corresponds, for example, to the ignition timing and at the same time performing a misfire suppression processing (e.g., control of the refiring for the engine cylinder in which the misfire took place) on the basis of the misfire detection signal C generated when the detected ion current value I indicates a misfire level. As the engine control parameter Ta, not only the ignition timing but also other various parameters such as the fuel injection timing, the ignition coil on/off timing, etc., can be employed.

Figure 8:
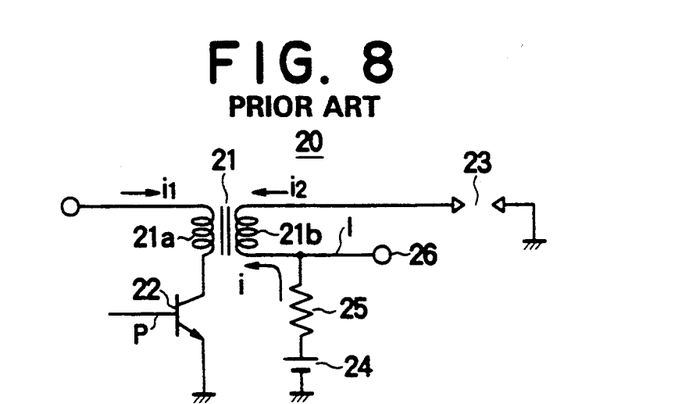
FIG. 8 is a circuit diagram showing a configuration of a conventional ion current detecting circuit.

FIG. 8 is a circuit diagram showing a structure of the ion current detector 20. As can be seen from this figure, the ion current detector 20 is composed of an ignition coil 21 having a primary winding 21a and a secondary winding 21b, a power transistor 22 for breaking a primary current $i_1$ flowing through the primary winding 21a in response to an ignition trigger pulse P generated in an ignition timing sequence, a spark plug 23 for producing a spark through electric discharge brought about by a high voltage induced in the secondary winding 21b upon turning-off of the primary current, a DC power supply source 24 for deriving as an ion current i those ions which are produced by the explosive combustion primed by the spark discharge in the spark plug 23, a resistor 25 connected in series to the DC power supply source 24 for converting the ion current i into a voltage signal and an output terminal 26 for outputting the detected ion current I in the form of the voltage signal mentioned above.

Figure 9:
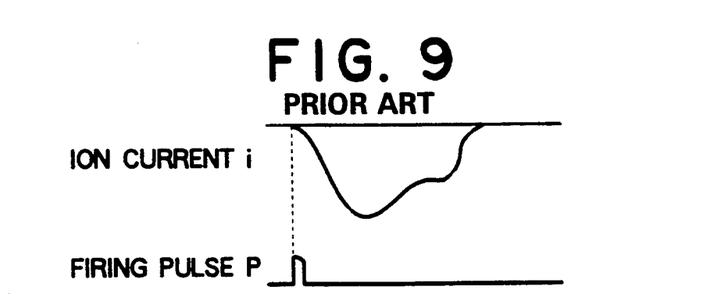
FIG. 9 is a waveform diagram showing a waveform of an ion current.

FIG. 9 is a waveform diagram showing a waveform of the ion current i. As can be seen from this figure, the ion current (of negative or minus polarity) i assumes a maximum level in the vicinity of the crank angle of A10° (10° after the top dead center) in succession to the explosion triggered by the spark discharge produced at the ignition plug 23 upon turning-off of the primary current $i_1$ in response to the ignition trigger or control pulse P.

Now, description will turn to the operation of the engine misfire detection/decision apparatus shown in FIG. 7 by reference to FIGS. 8 and 9.

Usually, the engine control parameter setting means 31 sets the ignition timing (i.e. the time point for ignition) with reference to the reference position which corresponds to a rising edge or a falling edge of the reference position signal T$\theta$ and determines the ignition timing so as to be optimal for the prevailing engine operation state D by consulting a data map or table, to thereby output as the control parameter Ta a gap time or duration which is to intervene between the reference position and the ignition time point.

On the other hand, the misfire detecting means 32 determines the combustion state within the engine cylinder in each ignition cycle on the basis of the reference position signal T$\theta$ output from the angular position detector 1 and the detected ion current value I output from the ion current detecting circuit 20 and generates the misfire detection signal C for the engine cylinder for which the detected ion current value I produced immediately after the explosion stroke is lower than a predetermined reference level. The engine control parameter setting means 31 responds to the misfire detection signal C input thereto by correcting the control parameter Ta for the engine cylinder misfired so that occurrence of misfire in that cylinder can be suppressed. To this end, the ignition timing control can be modified appropriately or alternatively the ignition energy may be increased by elongating the electrical conduction of the primary current $i_1$ through the ignition coil 21. Further, in association with the fuel injection control, the injection period may be increased to enrich the air/fuel mixture. In case the misfire susceptibility is not improved even by the correction of the control parameter Ta as mentioned above, fuel injection to the engine cylinder suffering the misfire can be stopped to thereby prevent the discharge of the uncombusted gas to the atmosphere.

In general, when the power transistor 22 is turned off in response to the ignition control pulse P in the ignition cycle, a high voltage of negative polarity is applied across the spark plug 23 connected to the secondary winding 21b of the ignition coil 21, as a result of which an electric discharge takes place between a pair of electrodes of the spark plug 23 to fire the gas mixture which then undergoes an explosive combustion. At this time, ions are produced within the engine cylinder due to ionization brought about by the explosive combustion. After the explosion, the electrode of the spark plug 23 to which a bias voltage is applied from the DC power supply source 24 serves as an electrode for detecting the ion current i.

The ions inclusive of electrons produced within the engine cylinder are caused to migrate under the effect of the electric field of the bias voltage of positive (plus) polarity supplied from the DC power supply source 24, giving rise to the ion current i, which is then converted to the detection voltage I by the resistor 25 to be outputted from the output terminal 26. Thus, it is possible to make a decision as to whether or not the combustion has taken place in the engine cylinder in the ignition cycle by checking the level of the detected ion current signal I.

However, since the misfire phenomenon may also occur in dependence on the engine operation or running states D and other conditions regardless of the actual states of the engine cylinder, it is not proper to make a decision as to the occurrence of misfire only on the basis of the misfire detection signal C. Further, the control procedure for coping with the misfire should preferably be modified by taking into consideration a misfire rate which represents susceptibility to the misfire or likelihood of occurrence of misfire.

The misfire rate may be determined on the basis of the number of the misfire detection signals C generated during a predetermined period. However, it is impossible to determine the misfire rate with a reasonable accuracy unless the timing at which the misfire detection signal C is generated is taken into account, which however requires a complicated implementation of decision logic. In reality, any approach proposed heretofore for determining the misfire rate has lead to very complicated logical configuration of the misfire detecting means 32.

SUMMARY OF THE INVENTION

As will now be understood from the foregoing, the misfire detection/decision apparatus for the internal combustion engine known heretofore which is designed to detect the occurrence of misfire on the basis of only the misfire detection signal is poor in reliability, presenting a problem that misfire control may unnecessarily and undesirably be performed. Further, an attempt to improve the reliability of the misfire decision by taking into consideration the misfire rate leads to very complicated and expensive implementation of the decision logic.

In light of the state of the art described above, it is therefore an object of the present invention to provide an improved engine misfire detection/decision apparatus which can assure a high reliability in the misfire decision without involving any appreciable complication in the decision logic.

In view of the above and other objects which will become more apparent as description proceeds, there is provided according to an aspect of the present invention an apparatus for detecting and deciding occurrence of misfire in an internal combustion engine, which apparatus comprises an angular position detector for generating a reference position signal which corresponds to a predetermined crank angle of an engine cylinder in synchronism with rotation of the engine, sensor means for detecting running or operating states of the engine, a combustion state detector for detecting combustion states in at least one of the engine cylinders, an engine control parameter setting means for setting control parameters for the engine on the basis of the reference position signal and the running state signals, a misfire detecting means for generating a misfire detection signal indicative of occurrence of misfire in the engine cylinder on the basis of a detection output signal of the combustion state detector, a misfire interval counter for measuring a misfire interval by counting an interval at which the misfire detection signal is generated, and a misfire rate decision means for generating a misfire rate decision signal when the misfiring interval becomes shorter than a predetermined interval, wherein the control parameter setting means corrects the control parameters on the basis of the misfire rate signal.

In a predetermined mode for carrying out the invention, the engine misfire detection/decision apparatus described above may further comprise a transient operation deciding means for deciding a transient operation state of the engine on the basis of at least one of the reference position signal and the engine running states, wherein the misfire rate decision means decreases the predetermined interval mentioned above when a transient operation state is decided.

According to a second aspect of the invention, there is provided an apparatus for detecting/deciding occurrence of misfire in an internal combustion engine, which apparatus comprises an angular position detector for generating a reference position signal which corresponds to a predetermined crank angle of an engine cylinder in synchronism with rotation of the engine, sensor means for detecting running or operating states of the engine, a combustion state detector for detecting combustion state in at least one of the engine cylinders, a control parameter setting means for setting control parameters of the engine on the basis of the reference position signal and the engine operating states, a misfire detecting means for generating a misfire detection signal indicative of occurrence of misfire in the engine on the basis of a detection output signal of the combustion state detector, a misfire interval counter for measuring a misfire interval by counting an interval at which the a misfire detection signal is generated, and a misfire rate decision means for generating a misfire rate signal when the misfire interval becomes shorter than a predetermined interval, a misfire interval counter for counting a number of times at which the misfire rate signal is generated successively for thereby generating a misfire occurrence count signal, and a misfire occurrence decision means for generating a misfire occurrence decision signal when the misfire occurrence count becomes greater than a predetermined value, wherein the control parameter setting means corrects the engine control parameters on the basis of the misfire occurrence decision signal so that the misfire can be suppressed from occurrence.

In a preferred embodiment of the invention, the engine misfire decision apparatus described above may further include a transient operation decision means for deciding a transient operation state of the engine on the basis of at least one of the reference position signal and the engine operating state signal, wherein upon decision of the transient operation state, at least one of the misfire rate decision means and the misfire occurrence decision means operates to decrease the predetermined interval mentioned above or alternatively increase the predetermined number of times mentioned above.

With the structures of the misfire detection/decision apparatus according to the invention, reliability of the decision for the occurrence of misfire in the engine can significantly be enhanced without need for complicated and expensive decision logic therefor.

The invention will become more readily apparent from the following description of preferred or exemplary embodiments thereof shown, by way of example only, in the drawings.

DESCRIPTION OF THE PREFERRED EMBODIMENTS

Now, the present invention will be described in detail in conjunction with preferred or exemplary embodiment thereof by reference to the drawings.

EMBODIMENT 1

Figure 1:
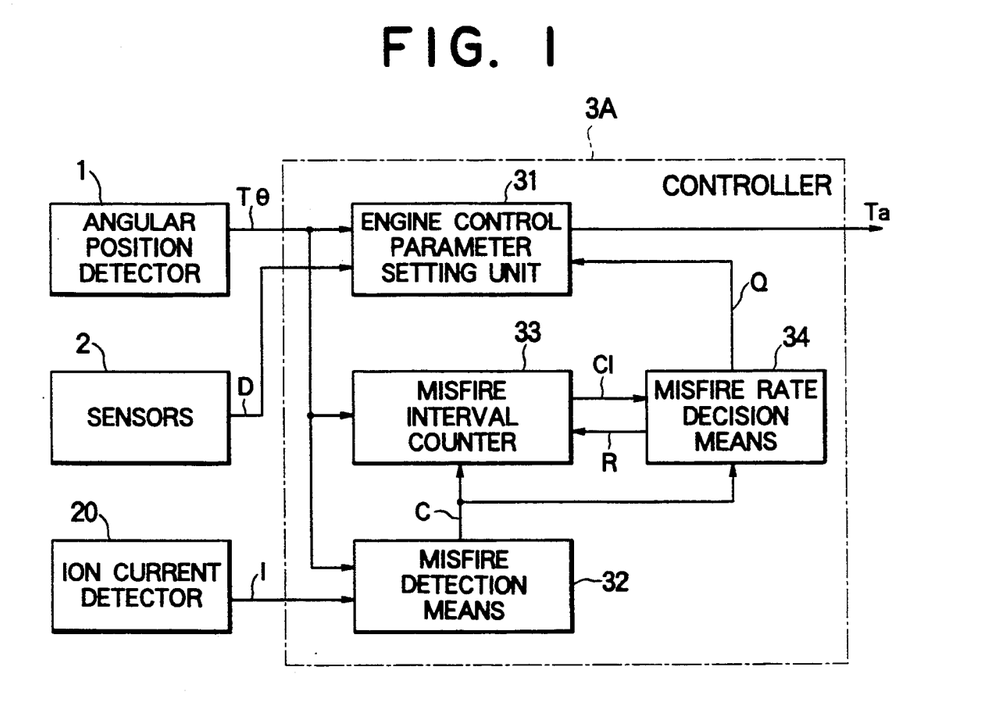
FIG. 1 is a functional block diagram showing generally an arrangement of an engine misfire detection/decision apparatus according to a first embodiment of the present invention.

FIG. 1 is a functional block diagram showing generally an arrangement of an engine misfire detection/decision apparatus according to a first embodiment of the present invention. In the figure, a reference symbol 3A denotes a control unit which corresponds to the control unit 3 described hereinbefore by reference to FIG. 7. Further, an angular position detector 1, a set of various sensors 2, an-ion current detector 20 and a misfire detecting means 32 are same as or equivalent to those designated by like reference numerals in FIG. 7 and described hereinbefore in conjunction with the related art of the invention. Accordingly, repeated description thereof will be unnecessary.

It should however be noted that the control unit 3A according to the instant embodiment further includes a misfire interval counter 33 and a misfire rate decision means 34 in addition to the engine control parameter setting means 31 and the misfire detecting means 32.

Referring to FIG. 1, the misfire interval counter 33 is so arranged as to be reset by a misfire detection signal C while being incremented at every predetermined crank angle relative to a reference crank position indicated by a reference position signal $T\theta$, to thereby determine a time interval at which the misfire detection signal C is generated and output a count value CI indicative of the interval at which the misfire takes place.

On the other hand, the misfire rate decision means 34 is so arranged as to decide occurrence of misfire in the associated internal combustion engine when the misfire interval (count value) CI becomes shorter than a predetermined interval N1, to thereby generate a misfire rate decision signal Q which is inputted to the engine control parameter setting means 31 and a reset signal R for resetting a misfire flag FL placed in the misfire interval counter 33 and the count value CI thereof.

In response to the input of the misfire rate decision signal, the engine control parameter setting means 31 corrects the control parameter Ta to a value lying in a misfire suppression range.

Next, operation of the engine misfire detection/decision apparatus according to the instant embodiment of the invention will be described in detail by reference to a flow chart of FIG. 2 which illustrates processing operations performed by a CPU (not shown) incorporated in the control unit 3A in cooperation with the misfire interval counter 33 and the misfire rate decision means 34. In this conjunction, it is assumed that the predetermined interval N1 mentioned above is previously set in the misfire rate decision means 34 to serve as a reference value in making the misfire decision.

Normally, the control parameter setting means 31 is in charge of determining arithmetically the engine operation control parameter Ta and the engine running state D such as mentioned hereinbefore and performs correction of the engine control parameter Ta upon issuance of decision of occurrence of the misfire.

Figure 2:
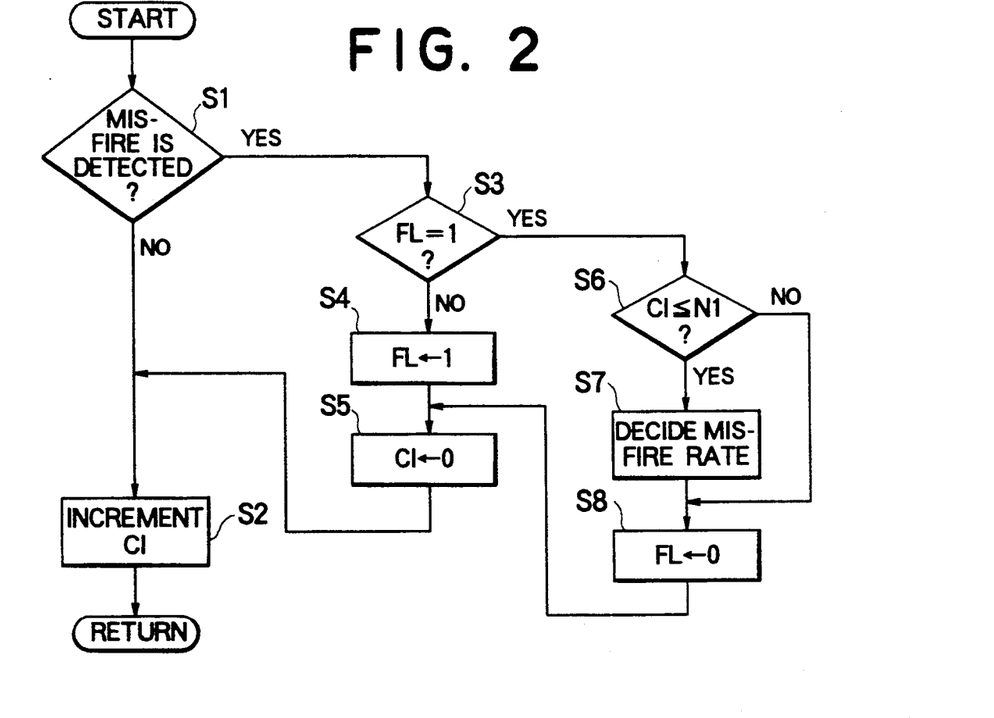
FIG. 2 is a flow chart for illustrating a misfire detection/decision procedure adopted in the apparatus shown in FIG. 1.

The misfire interval counter 33 and the misfire rate decision means 34 cooperate to perform a misfire rate decision processing procedure shown in FIG. 2 at every predetermined crank angle.

More specifically, in a step S1, decision is made as to whether the misfire detection signal C is generated by the misfire detector 32 which may be constituted by an ion current detecting circuit as described hereinbefore. Unless the misfire detection signal C is generated, the count value CI placed in the counter 33 and representing duration of the misfire interval is incremented in a step S2, whereupon the step S1 is resumed.

It is now assumed that the ion current detection value I becomes lower than the reference value thereof at a crank angle, for example, of A10°, indicating occurrence of misfire. Then, the misfire detection signal C is generated by the misfire detecting means 32. In response thereto, decision is made by the CPU as to whether or not the misfire flag FL of "1" has already been set in the misfire interval counter 33, i.e., whether or not the misfire detection signal C has once been generated in the preceding detection cycle.

When the misfire flag FL is "0", indicating that the misfire detection signal C generated at the crank angle of A10° is a first one, the misfire flag FL is then set to "1" in a step S4, while the count value CI in the counter 33 is reset to "0" in a step S5, whereupon the processing proceeds to the step S2 to increment the count value CI.

On the other hand, when the misfire flag FL is found to be "1" in the step S3, indicating that the misfire detection signal C has once been generated, then the misfire rate decision means 34 fetches the count value CI in response to the misfire detection signal C and makes decision as to whether or not the count value CI representing the misfire interval duration is equal to or smaller than the predetermined interval value N1 in a step S6.

In case the misfire interval count value CI is equal to or smaller than the predetermined interval value N1 (i.e., in case the answer of the decision step S6 is "YES"), this may duly be interpreted as indicating the misfire susceptible state of the associated engine cylinder in which the misfire detection signal C is generated frequently. Accordingly, the misfire rate decision means 34 generates the misfire rate or likelihood decision signal Q in a step S7.

Subsequently, the misfire flag FL is reset to "0" in a step S8, which is then followed by executing of a step S5 where the count value CI is reset to "0" to thereby allow succeeding misfire interval CI to be measured by the misfire interval counter 33.

On the other hand, when it is decided in the step S6 that the misfire interval CI is greater than the predetermined interval value N1 (i.e., when the decision step S6 results in "NO"), this means that the frequency of generation of the misfire detection signal C is too low to decide positively the actual occurrence of misfire. Accordingly, the step S8 for resetting the misfire flag FL is immediately executed. In this case, the misfire rate decision means 34 can generate no misfire decision signal Q.

The engine control parameter setting means 31 responds to the input of the misfire rate decision signal Q by correcting the control parameter Ta for the engine cylinder for which occurrence of the misfire has been decided so that any further occurrence of misfire in that cylinder can be suppressed. Of course, when it is found impossible to suppress the occurrence of misfire through the correction of the control parameter, the fuel injection to the cylinder of concern can be stopped, to thereby prevent the discharge of the exhaust gas containing uncombusted fuel components.

As will be appreciated from the foregoing, the misfire rate decision signal Q is made available by the misfire rate decision means 34 with a simple logical procedure by virtue of the measurement of the misfire interval CI, starting from the first misfire detection signal C, by the misfire interval counter 33.

EMBODIMENT 2

In the case of the first embodiment of the invention described above, occurrence of misfire in the engine is decided when the misfire rate decision signal Q is generated, which is then followed immediately by the correction of the engine operation control parameter Ta. With the second embodiment of the invention, it is contemplated to increase the reliability of the misfire decision with such an arrangement that the control parameter Ta is corrected only when the misfire rate decision signal Q is generated successively more than a predetermined number of times N2 within a predetermined time span.

Figure 3:
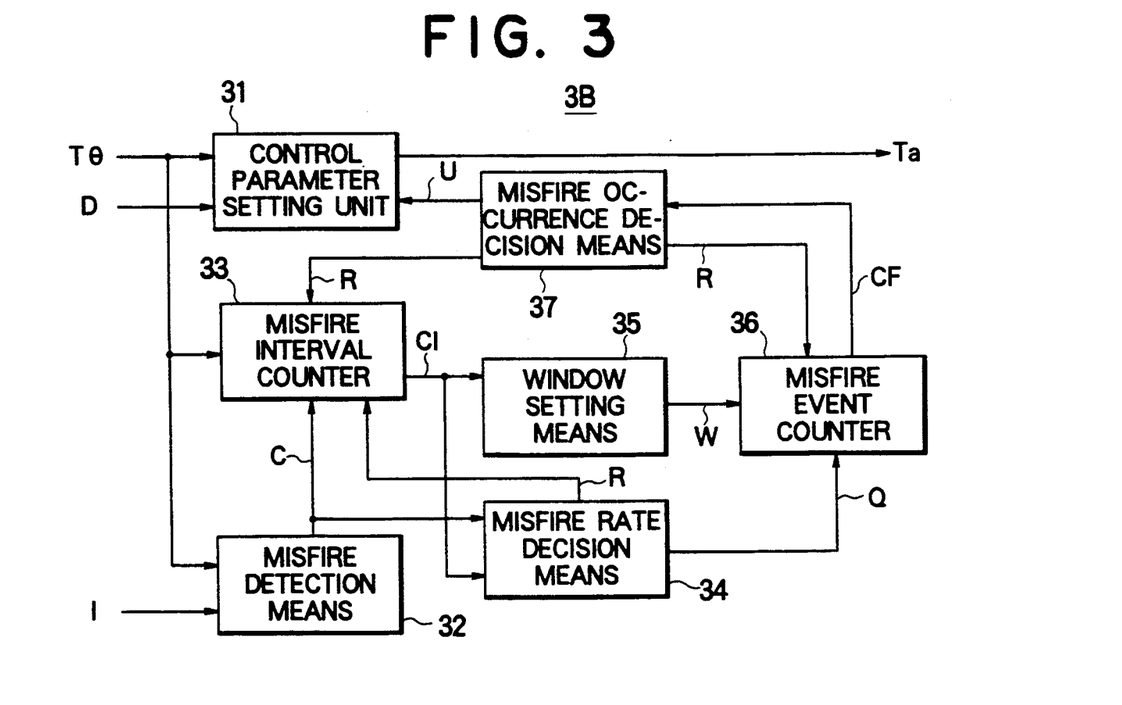
FIG. 3 is a functional block diagram showing generally a functional structure of an engine misfire detection/decision apparatus according to a second embodiment of the invention.

FIG. 3 is a functional block diagram showing a general arrangement of the engine misfire detection/decision apparatus according to the second embodiment of the invention. In the figure, reference symbol 3B denotes generally a controller which corresponds to the controller 3A described above.

In the misfire detection/decision apparatus according to the instant embodiment, there are additionally provided a window setting means 35 for setting as a window W a predetermined period N starting from a time point when the first misfire detection signal C was generated, a misfire event counter 36 for measuring or counting as a misfire decision count value CF a number of times the misfire rate decision signal Q has successively been generated during the predetermined period N mentioned above and a misfire occurrence decision means 37 for generating a misfire occurrence decision signal U when the misfire event count value CF becomes equal to or exceeds a predetermined value N2.

The misfire occurrence decision signal U outputted from the misfire occurrence decision means 37 is inputted to the control parameter setting means 31 and at the same time utilized for setting the misfire flag FL in the misfire interval counter 33 and the misfire counter 36 and for generating a reset signal for resetting the counter values CI and CF.

In response to the misfire occurrence decision signal U, the control parameter setting means 31 corrects the control parameter Ta so as to suppress the occurrence of misfire.

Figure 4:
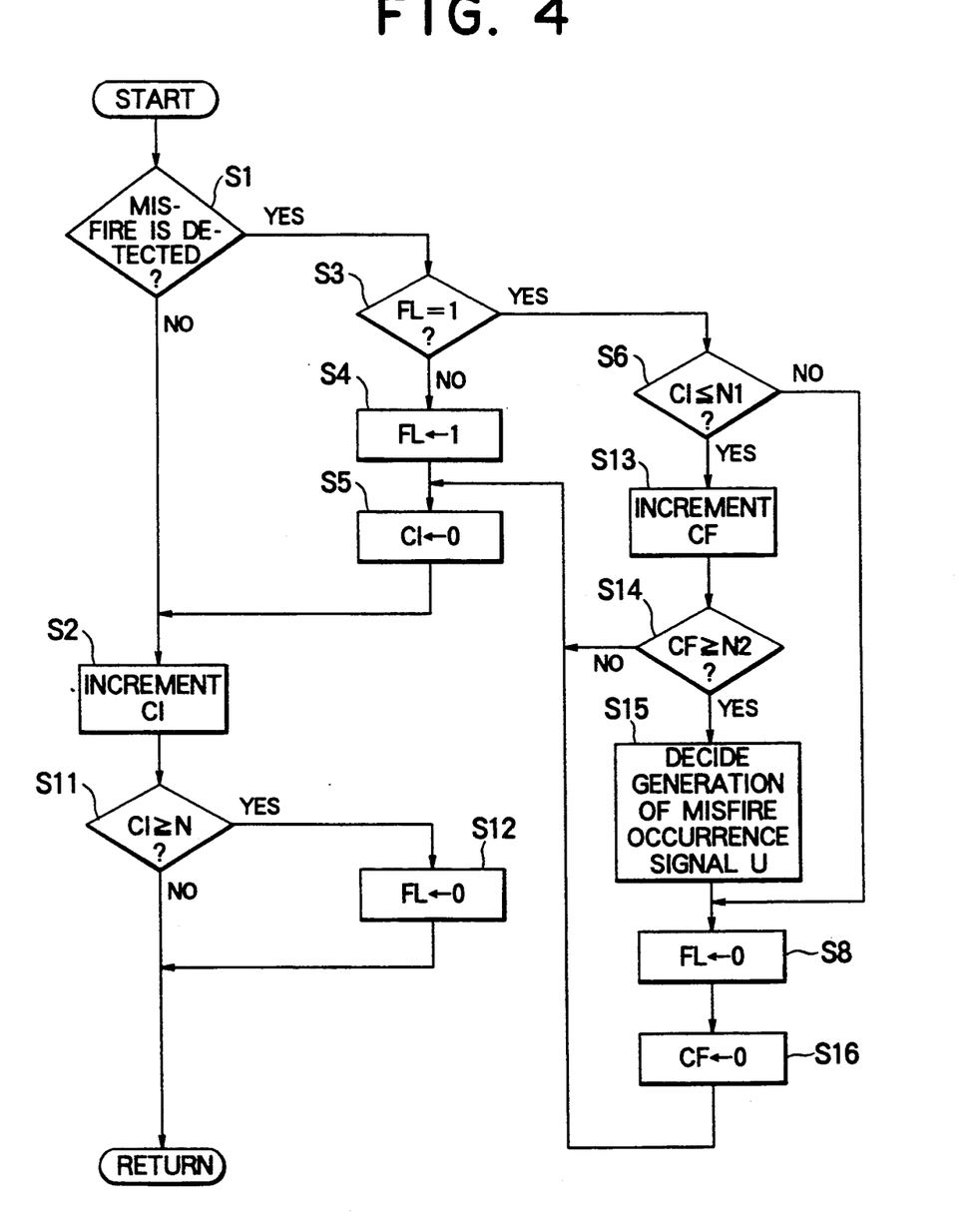
FIG. 4 is a flow chart for illustrating a misfire decision procedure adopted in the apparatus shown in FIG. 3.

FIG. 4 is a flow chart for illustrating a misfire occurrence decision procedure realized by a loop extending from the misfire interval counter 38 to the misfire occurrence decision means 37 shown in FIG. 3. In the figure, steps S1 to S6 and S8 are same as those denoted by like reference symbols in FIG. 2. Accordingly, repeated description of these steps will be unnecessary.

Now, referring to FIG. 4 along with FIG. 3, description will be made of operation of the misfire detection/decision apparatus according to the instant embodiment. It is assumed that a predetermined period N corresponding to the aforementioned window W and a predetermined number of times N2 serving as a reference for the misfire decision are previously set in the window setting means 35 and the misfire occurrence decision means 37, respectively, and that the predetermined period N is longer than the predetermined interval N1 set in the misfire decision means 34 as described previously in conjunction with the first embodiment.

Referring to FIG. 4, in the step S1, the misfire interval counter 33 is incremented at every predetermined crank angle. Thereafter, it is decided through cooperation of the CPU not shown and the window setting means 35 whether the counter value CI is equal to or greater than the predetermined interval value N in a step S11.

If the decision in the step S11 is negative (NO), return is made to the step S2.

On the other hand, when the result of the decision step S11 is positive (YES), it is decided that the misfire interval does not fall within the window W, whereby the misfire flag FL is reset to "0" in a step S12), whereupon the step S2 is resumed.

More specifically, upon lapse of the predetermined period N from the generation of the misfire detection signal C, a misfire detection signal C generated subsequently is considered to be a first misfire detection signal, whereby the processing is inhibited from proceeding to the decision step S6.

On the contrary, when a subsequent misfire detection signal C is generated within the predetermined period N from the time point at which the misfire flag FL has been set to "1" in response to generation of the first misfire detection signal C, the processing proceeds to the misfire decision step S6 from the step S3. In the step S6, it is decided whether the misfire interval counter value CI is equal to or smaller than the predetermined interval value N1. If so, the misfire rate decision signal Q is generated by the misfire rate decision means 34. Then, the misfire event counter 36 responds to the misfire rate decision signal Q to increment the counter value CF representing the number of times the decision of misfire event has been made (step S13).

Subsequently, in a step S14, the misfire occurrence decision means 37 makes decision as to whether or not the misfire event counter value CF is equal to or greater than the predetermined number of times N2 (e.g. twice). If not, the step S5 is executed to reset the misfire interval count value CI to "0". If the misfire event counter value CF attains or exceeds the predetermined number of times N2, the misfire occurrence decision means 37 decides that the misfire has really occurred and generates the misfire occurrence decision signal U in a step S15. In response thereto, the control parameter setting means 31 corrects the control parameter Ta for suppressing the misfire to thereby protect the engine and the catalyst from injury.

Subsequently, in response to the reset signal R generated by the misfire occurrence decision means 37, the misfire flag FL is reset to "0" in the step S8. At the same time, the counter value CF in the misfire counter 36 is also reset to "0" in a step S16. The processing then proceeds to the step S5 where the counter value CI is reset to "0" as well.

As is apparent from the above description, reliability of the misfire occurrence decision can further be enhanced according to the instant embodiment by virtue of such arrangement that the occurrence of misfire is decided only when the misfire decision signals Q are generated in succession within a predetermined period at a higher frequency than a predetermined one.

EMBODIMENT 3

In the case of the misfire detection/decision apparatuses according to the first and second embodiments of the invention, the predetermined interval N1 and the predetermined number of times N2 serving as the reference values for the decision as to occurrence of misfire are set as fixed values, respectively. However, when the engine is in the transient operation state such as in the starting and accelerating operation modes, the misfire state may erroneously be detected even when the engine is running normally. Accordingly, in the transient operation state of the engine, it is preferred to alter or modify the criterion or reference values for the misfire decision so as to evade erroneous or false misfire decision.

Figure 5:
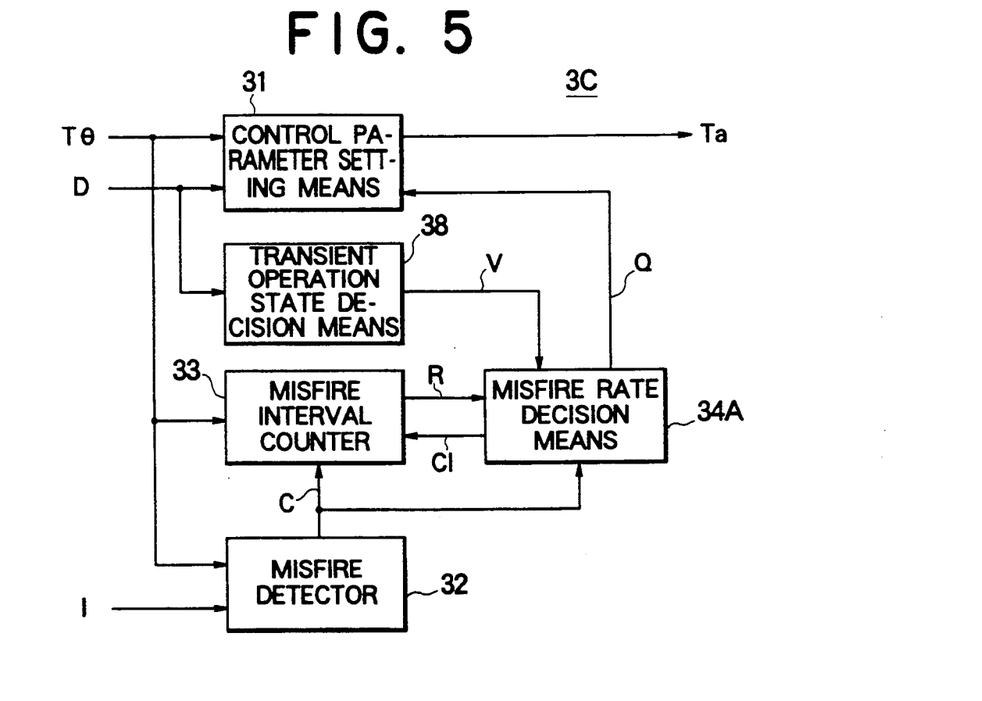
FIG. 5 is a functional block diagram showing generally a functional structure of an engine misfire detection/decision apparatus according to a third embodiment of the invention.

FIG. 5 is a functional block diagram showing misfire detection/decision apparatus according to a third embodiment of the invention. In the figure, reference symbols 3C and 34A denote a controller and a misfire rate decision means which correspond to those denoted by 3A and 34, respectively, in the description of the preceding embodiments.

In the apparatus according to the third embodiment of the invention, there is additionally provided a transient operation decision means 38 for deciding whether the engine is in a transient operation state on the basis of at least one of the reference position signal $T\theta$ and the engine running state signal D. A transient operation decision signal V generated by this means 38 is inputted to the misfire rate decision means 34A.

In the case of the apparatus now under consideration, the misfire rate decision means 34A is imparted with a function for altering the predetermined interval value N1. More specifically, the predetermined interval value N1 is decreased in accordance with the transient operation decision signal V.

Figure 6:
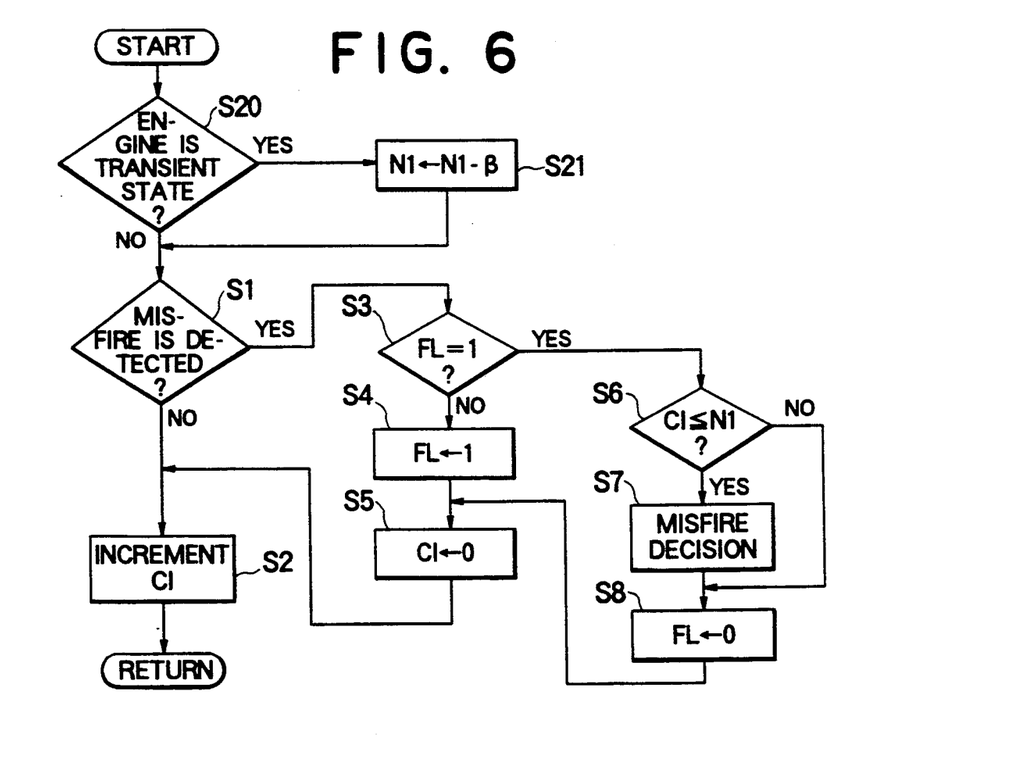
FIG. 6 is a flow chart for illustrating a misfire decision procedure adopted in the apparatus shown in FIG. 4.

FIG. 6 is a flow chart for illustrating a misfire decision procedure performed through cooperation of the CPU and the misfire interval counter 33, the misfire rate decision means 34A and the transient operation decision means 38. In the figure, the steps S1 to S8 are same as those described previously.

Now, operation of the misfire decision apparatus according to the instant embodiment will be described below by reference to FIG. 6.

In precedence to the step S1 for deciding the presence or absence of the misfire detection signal C, the transient operation decision means 38 makes decision as to whether or not the engine is in the transient operation state on the basis of the reference position signal $T\theta$ and/or the engine running state signal conditions D in a step S20.

If the engine is in a steady state rather than the transient state, the step S1 is executed. If otherwise, a transient state decision signal V is generated by the transient operation decision means 38.

In response to the input of the transient decision signal V, the misfire rate decision 34A substrates a value $\beta$ from the predetermined interval N1 and sets a difference $(N-\beta)$ as an updated value of the predetermined interval N1 in a step S21, whereon the processing proceeds to the step S1.

In this manner, the probability of the misfire interval counter value C1 being smaller than the predetermined interval value N1 in the misfire rate decision step S6 is lowered in the transient state of the engine, whereby generation of erroneous or false misfire rate decision signal Q is suppressed in the transient engine operation state. Thus, a high reliability of the misfire decision can be assured even in the transient operation state of the engine.

EMBODIMENT 4

In the case of the preceding embodiment 3, the transient operation decision means 38 is added to the apparatus of the first embodiment shown in FIG. 1. However, the former may be provided in combination with the apparatus of the second embodiment (FIG. 3). In that case, in response to the transient operation decision signal V, at least one of the misfire rate decision means 34, the window setting means 35 and the misfire occurrence decision means 37 alters the predetermined interval value N1 or the predetermined period N or the predetermined number of times N2. In other words, when the transient operation decision signal V is generated, the value of N1 or N is decreased correspondingly or alternatively the value of N2 may be increased. More specifically, referring to FIG. 6, in a decision reference altering step S21, a value $a$ is subtracted from the predetermined period N, and a difference (N−a) is set as an updated predetermined period or alternatively a value $\gamma$ is added to the predetermined number of times N2, whereon a sum (N2+$\gamma$) is set as an updated number of times for the reference. The alteration mentioned above may be preformed in combination with alteration of the predetermined interval value N1.

EMBODIMENT 5

In the misfire detection/decision apparatuses according to the preceding embodiments, the ion current detector 20 is used as the means for detecting the combustion state. It goes however without saying that a cylinder pressure sensor, a temperature sensor, a vibration sensor or the like sensor may be employed to a substantially same effect.

EMBODIMENT 6

In the foregoing description, it is assumed that the misfire rate decision signal Q represents only the misfire state or level (or likelihood). However, such arrangement may equally be adopted that the misfire decision signal Q reflects magnitude of the misfire interval counter value CI. In that case, when magnitude of the value CI is less significant in a relative sense, the control parameter setting means 31 corrects the control parameter Ta so as to suppress the occurrence of misfire, while when magnitude of the value CI is more significant, the measures such as interruption of the fuel supply may be taken.

Many features and advantages of the present invention are apparent from the detailed specification and thus it is intended by the appended claims to cover all such features and advantages of the system which fall within the true spirit and scope of the invention. Further, since numerus modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An apparatus for detecting and deciding occurrence of misfire in an internal combustion engine, said apparatus comprising:

angular position detecting means for generating a reference position signal corresponding to a predetermined crank angle of an engine cylinder in synchronism with rotation of said internal combustion engine;

sensor means for detecting a running state of said internal combustion engine;

combustion state detecting means for detecting combustion state in at least one of a number of cylinders of said internal combustion engine;

control parameter setting means for setting a control parameter of said internal combustion engine on the basis of said reference position signal and said running state;

misfire detecting means for generating a misfire detection signal indicative of occurrence of misfire in said internal combustion engine on the basis of detection of an output of said combustion state detecting means;

misfire interval counter means for measuring as a misfire interval an interval between successive misfire detection signals;

misfire rate decision means for generating a misfire rate decision signal when said misfire interval is shorter than a predetermined interval; and transient operation decision means for detecting a transient operation state of said internal combustion engine on the basis of at least one of said reference position signal and said running state;

wherein said misfire rate decision means decreases said predetermined interval when said transient operation state is detected; and wherein said control parameter setting means corrects said control parameter on the basis of said misfire rate decision signal.

2. The apparatus according to claim 1, wherein said combustion state detecting means is one of an ion current detector, a cylinder pressure sensor, a temperature sensor and a vibration sensor.

3. The apparatus according to claim 1, wherein said control parameter is at least one of an ignition timing control parameter and a fuel injection timing control parameter.

4. An apparatus for detecting and deciding occurrence of misfire in an internal combustion engine, said apparatus comprising:

angular position detecting means for generating a reference position signal corresponding to a predetermined crank angle of engine cylinders in synchronism with rotation of said internal combustion engine;

sensor means for detecting a running state of said internal combustion engine;

combustion state detecting means for detecting combustion state in at least one of the engine cylinders;

control parameter setting means for setting a control parameter of said internal combustion engine on the basis of said reference position signal and said running state;

misfire detecting means for generating a misfire detection signal indicative of occurrence of misfire in said engine on the basis of detection of an output of said combustion state detecting means;

misfire interval counter means for measuring as a misfire interval an interval between successive misfire detection signals;

misfire rate decision means for generating a misfire rate decision signal when said misfire interval is shorter than a predetermined interval;

misfire event counter means for counting a number of times at which said misfire rate decision signal is generated in succession, to thereby generate a misfire event count signal; and misfire occurrence decision means for generating a misfire occurrence decision signal when said misfire event count signal exceeds a predetermined level;

wherein said control parameter setting means corrects said control parameter on the basis of said misfire occurrence decision signal.

5. The apparatus according to claim 4, further comprising:

transient operation decision means for detecting a transient operation state of said internal combustion engine on the basis of at least one of said reference position signal and said running state;

wherein upon decision of said transient operation state, said misfire rate decision means and said misfire occurrence decision means respectively perform one of a decrease in said predetermined interval and an increase in said predetermined number of times.

6. The apparatus according to claim 4, wherein said combustion state detecting means is one of an ion current detector, a vibration sensor, a temperature sensor and a cylinder pressure sensor.

7. The apparatus according to claim 4, wherein said control parameter is at least one of an ignition timing control parameter and a fuel injection timing control parameter.

* * * * *